(12) United States Patent
Wilson et al.

(10) Patent No.: US 8,532,844 B2
(45) Date of Patent: Sep. 10, 2013

(54) METHODS AND SYSTEMS FOR DISPLAYING ANNOTATIONS ON AN AIRCRAFT DISPLAY

(75) Inventors: Blake Wilson, Peoria, AZ (US); Dave Pepitone, Sun City West, AZ (US); Roger W. Burgin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 12/820,773

(22) Filed: Jun. 22, 2010

(65) Prior Publication Data

US 2011/0313597 A1    Dec. 22, 2011

(51) Int. Cl.
    *G01C 23/00*    (2006.01)
(52) U.S. Cl.
    USPC .............................. 701/3; 701/120; 340/972
(58) Field of Classification Search
    USPC ............... 701/18, 418, 492; 340/951, 995.17
    See application file for complete search history.

(56) References Cited

U.S. PATENT DOCUMENTS

| | | | |
|---|---|---|---|
| 5,689,717 A * | 11/1997 | Pritt .............................. 715/234 |
| 6,154,219 A | 11/2000 | Wiley et al. |
| 6,199,008 B1 | 3/2001 | Aratow et al. |
| 6,522,958 B1 * | 2/2003 | Dwyer et al. ...................... 701/3 |
| 6,633,801 B1 * | 10/2003 | Durlacher et al. ................. 701/9 |
| 6,633,810 B1 | 10/2003 | Qureshi et al. |
| 6,940,530 B2 | 9/2005 | Chen et al. |
| 7,414,637 B2 | 8/2008 | Fogel et al. |
| 7,471,995 B1 * | 12/2008 | Robinson .......................... 701/3 |
| 7,499,771 B2 * | 3/2009 | Caillaud .......................... 701/3 |
| 7,693,621 B1 | 4/2010 | Chamas |
| 7,693,652 B2 * | 4/2010 | Cheung .......................... 701/467 |
| 7,769,501 B2 * | 8/2010 | Lusardi et al. .................... 701/3 |
| 2004/0006412 A1 * | 1/2004 | Doose et al. .................... 701/10 |
| 2005/0283305 A1 * | 12/2005 | Clark et al. ..................... 701/120 |
| 2006/0058949 A1 | 3/2006 | Fogel et al. |
| 2007/0288164 A1 * | 12/2007 | Gordon et al. ................. 701/213 |
| 2008/0027629 A1 * | 1/2008 | Peyrucain et al. ............. 701/206 |
| 2008/0201029 A1 | 8/2008 | Brown et al. |
| 2008/0319661 A1 | 12/2008 | Werner et al. |
| 2009/0052806 A1 * | 2/2009 | Morbey et al. ................. 382/302 |
| 2009/0231164 A1 | 9/2009 | Burgin et al. |
| 2009/0292462 A1 * | 11/2009 | Babetski ....................... 701/201 |
| 2010/0023259 A1 | 1/2010 | Krumm et al. |
| 2010/0127895 A1 * | 5/2010 | Wilson et al. ................. 340/972 |
| 2010/0148990 A1 | 6/2010 | Burgin et al. |
| 2010/0161160 A1 | 6/2010 | Wilson et al. |
| 2010/0262318 A1 * | 10/2010 | Ariens .............................. 701/3 |
| 2011/0118908 A1 * | 5/2011 | Boorman et al. ............... 701/14 |
| 2011/0264437 A1 * | 10/2011 | Wise et al. ....................... 704/3 |

\* cited by examiner

*Primary Examiner* — Thomas Black
*Assistant Examiner* — Luke Huynh
(74) *Attorney, Agent, or Firm* — Ingrassia Fisher & Lorenz, P.C.

(57) ABSTRACT

Methods and systems are provided for presenting content on a display device onboard an aircraft. A method comprises displaying, on the display device, information corresponding to a first procedure and displaying an annotation associated with the first procedure on the display device. The first procedure is associated with an airport and prescribes operation of the aircraft in a vicinity of the airport, and the annotation comprises user-defined information pertaining to the first procedure.

19 Claims, 6 Drawing Sheets

| Communication Frequencies | | |
|---|---|---|
| APP | 126.300 | Reno Approach Control |
| APP | 119.200 | Reno Approach Control |
| ATI | 135.800 | Reno Approach Control |
| CLD | 124.900 | Reno Approach Control |
| GND | 121.900 | Reno ATIS |
| APP | 118.700 | Reno ATIS |
| Navigation Frequencies | | |
| VORTAC | 117.900 | MUSTANG |

E. Side of Arpt Only

FIG. 6

METHODS AND SYSTEMS FOR DISPLAYING ANNOTATIONS ON AN AIRCRAFT DISPLAY

TECHNICAL FIELD

The subject matter described herein relates generally to avionics systems, and more particularly, embodiments of the subject matter relate to displaying annotations to content displayed on a display onboard the aircraft.

BACKGROUND

Published aeronautical charts, such as, for example, Instrument Approach Procedure (IAP) charts, Standard Terminal Arrival (STAR) charts, or Terminal Arrival Area (TAA) charts Standard Instrument Departure (SID) routes, Departure Procedures (DP), terminal procedures, approach plates, and the like, depict and describe the procedures for operating aircraft in the vicinity of various airports, runways, or other landing and/or departure locations. These charts graphically illustrate and describe the specific procedures (e.g., minimum descent altitudes, minimum runway visual range, final course or heading, relevant radio frequencies, missed approach procedures) to be followed or otherwise utilized by a pilot for a particular approach or departure. These charts are typically provided by a governmental or regulatory organization, such as, for example, the Federal Aviation Administration in the United States.

Traditionally, a pilot would maintain copies of these printed charts for the various possible airports that the pilot may encounter during operation of the aircraft. For example, for worldwide operation, there are as many as 17,000 charts, and each airport may include multiple runways with multiple possible approaches and departures. Often, a pilot would annotate the paper chart for a particular procedure with empirical information gained from previous experience executing the procedure. Thus, when the pilot consulted the paper chart for the procedure, the annotation(s) on the paper chart would remind the pilot of important information learned from previous experiences executing the procedure.

Electronic displays in many modern flight deck displays (or cockpit displays) have eliminated the need to maintain paper charts for the various procedures that a pilot may need to execute. However, in the absence of paper charts, the pilot does not have the ability to permanently annotate the electronically displayed procedure information. Often, execution of one of these procedures, such as an instrument approach procedure, is one of the most critical periods during operation of an aircraft. Therefore, it is desirable that the pilot be able to utilize any information gained from previous experience to facilitate safe and reliable execution of the particular procedure.

BRIEF SUMMARY

A method is provided for presenting content on a display device onboard an aircraft. The method comprises displaying, on the display device, information corresponding to a first procedure and displaying an annotation associated with the first procedure on the display device. The first procedure is associated with an airport and prescribes operation of the aircraft in a vicinity of the airport, and the annotation comprises user-defined information pertaining to the first procedure.

In another embodiment, a system suitable for use with an aircraft is provided. The system comprises a display device onboard an aircraft, a data storage element, and a processing system coupled to the display device and the data storage element. The display device has content pertaining to operation of the aircraft displayed thereon, wherein the content comprises one or more displayed objects. The data storage element is configured to maintain annotation information for one or more annotations, the annotation information for each respective annotation being associated with one or more display criteria. The processing system is configured to identify a first annotation of the one or more annotations that is associated with a first displayed object of the one or more displayed objects. The processing system is further configured to obtain status information for the aircraft and automatically display annotation information corresponding to the first annotation on the display device when the status information satisfies a display criterion for the first annotation.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

FIG. 6 is a schematic view of an exemplary radio frequency tuning display suitable for use with the annotation process of FIG. 2 and the display process of FIG. 4 in accordance with one embodiment.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Technologies and concepts discussed herein relate to systems for displaying, on a display device associated with an aircraft, one or more annotations to content displayed on the display device. As described in greater detail below, an annotation comprises user-defined information that is associated with a particular object or portion of the displayed content on the display device. In an exemplary embodiment, each annotation is associated with one or more display criteria which control the manner in which the annotation is subsequently displayed. During operation of the aircraft, the annotations may be displayed when current status information for the aircraft satisfies the one or more display criteria associated with the respective annotation. In this manner, annotations may be displayed only when they are relevant to the current operational status of the aircraft.

Figure 1:
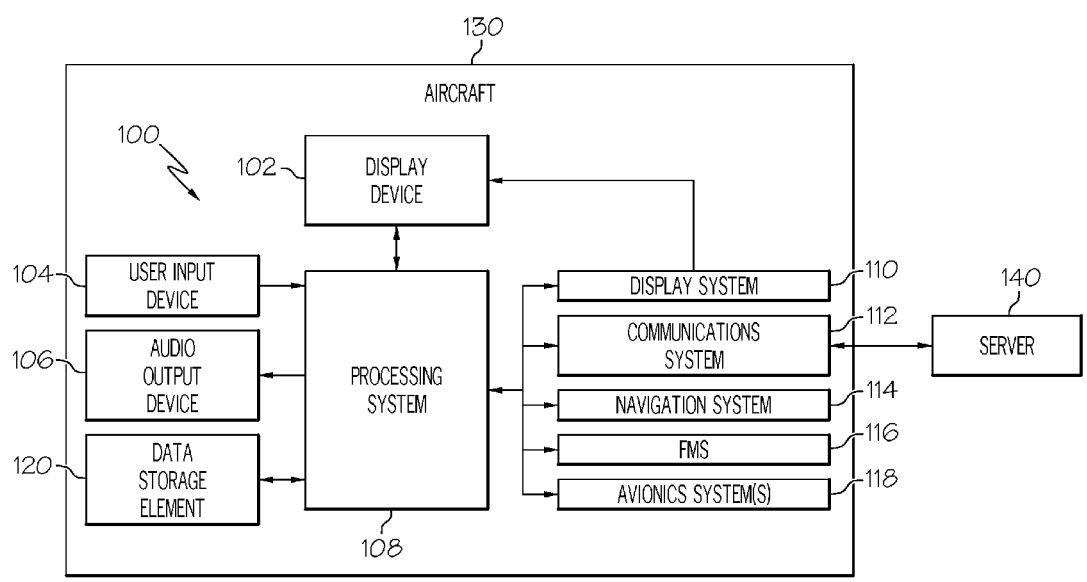
FIG. 1 is a block diagram of a system suitable for use with an aircraft in accordance with one embodiment.

FIG. 1 depicts an exemplary embodiment of a system 100 which may be utilized with a vehicle, such as an aircraft 130. In an exemplary embodiment, the system 100 includes, without limitation, a display device 102, a user input device 104, an audio output device 106, a processing system 108, a display system 110, a communications system 112, a navigation system 114, a flight management system (FMS) 116, one or more avionics systems 118, and a data storage element 120 suitably configured to support operation of the system 100, as described in greater detail below.

The display device 102 is realized as an electronic display configured to graphically display flight information or other data associated with operation of the aircraft 130 under control of the display system 110 and/or processing system 108. In this regard, the display device 102 is coupled to the display system 110 and the processing system 108, and the processing system 108 and the display system 110 are cooperatively configured to display, render, or otherwise convey one or more graphical representations or images associated with operation of the aircraft 130 on the display device 102, as described in greater detail below. The user input device 104 is coupled to the processing system 108, and the user input device 104 and the processing system 108 are cooperatively configured to allow a user (e.g., a pilot, co-pilot, or crew member) to interact with the display device 102 and/or other elements of the system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the system 100 in a "hands free" manner without requiring the user to move his or her hands and/or head to interact with the system 100. The audio output device 106 is coupled to the processing system 108, and the audio output device 106 and the processing system 108 are cooperatively configured to provide auditory feedback to a user. Depending on the embodiment, the audio output device 106 may be realized as a speaker, headphone, earphone, earbud, or another suitable device adapted to provide auditory output to a user. In this regard, in some embodiments, a user input device 104 and an audio output device 106 may be integrated on a single headset, as will be appreciated in the art.

In an exemplary embodiment, the display device 102, user input device 104 and processing system 108 are cooperatively configured to allow a user to annotate content displayed on the display device 102. In this regard, the processing system 108 is coupled to the data storage element 120, wherein the data storage element 120 is configured to maintain information for one or more annotations capable of being displayed on the display device 102. Each annotation comprises user-defined (or user-entered) information that is associated with or otherwise pertains to a displayed object or another logically distinct portion of the content displayed on display device 102. In this regard, annotation information is provided by a pilot, co-pilot, crew member, airline operational personnel, or another human and is not provided by a governmental body or a standards organization or from onboard avionics 110, 112, 114, 116, 118. In an exemplary embodiment, the annotation information comprises experiential or empirical operational information that enhances the meaning of that particular displayed object or portion of displayed content. As described in greater detail below, in an exemplary embodiment, the data storage element 120 maintains the association between the annotation information and the particular portion of content displayed on display device 102 that the annotation pertains to. Additionally, the data storage element 120 maintains an association between the annotation information and one or more display criteria that govern the display of the annotation on the display device 102, as described in greater detail below. Depending on the embodiment, the data storage element 120 may be realized as RAM memory, ROM memory, flash memory, registers, a hard disk, or another suitable data storage medium known in the art or any suitable combination thereof.

The processing system 108 generally represents the hardware, software, and/or firmware components configured to facilitate communications and/or interaction between the user input device 104 and the other elements of the system 100 and perform additional tasks and/or functions to support annotations on the display device 102, as described in greater detail below. Depending on the embodiment, the processing system 108 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In some embodiments, when the user input device 104 is realized as an audio input device, the processing system 108 may implement a speech recognition engine (or voice recognition engine) and/or speech-to-text system adapted to receive audio input from a user. In this regard, the processing system 108 may also include one or more analog-to-digital converters (ADCs), digital-to-analog converters (DACs), analog filters and/or digital filters suitably configured to support operations of the system 100.

The display system 110 generally represents the hardware, software, and/or firmware components configured to control the display and/or rendering of one or more navigational maps and/or other displays pertaining to operation of the aircraft 130 and/or systems 112, 114, 116, 118 on the display device 102. In this regard, the display system 110 may access or include one or more databases suitably configured to support operations of the display system 110, such as, for example, a terrain database, an obstacle database, a navigational database, a geopolitical database, a terminal airspace database, a special use airspace database, or other information for rendering and/or displaying content on the display device 102.

In an exemplary embodiment, the display system 110 includes or otherwise accesses a database that contains aircraft procedure information for a plurality of airports and maintains the association of the aircraft procedure information and the corresponding airport. As used herein, aircraft procedure information should be understood as a set of operating parameters or instructions associated with a particular aircraft action that may be undertaken by the aircraft 130 at or in the vicinity of a particular airport. In this regard, an airport should be understood as referring to a location suitable for landing (or arrival) and/or takeoff (or departure) of an aircraft, such as, for example, airports, runways, landing strips, and other suitable landing and/or departure locations, and an aircraft action should be understood as referring to an approach (or landing), a departure (or takeoff), taxiing, or another aircraft action having associated aircraft procedure information. Each airport may have one or more predefined approaches associated therewith, wherein each approach may have instrument approach procedure information associated therewith. For example, an airport may comprise a plurality of possible approaches depending on the particular airport runway chosen for landing. In a similar manner, an airport (or departure location) may have at least one departure route having instrument departure procedure information associated therewith, as will be appreciated in the art. The aircraft procedure information is provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts, or Terminal Arrival Area (TAA) charts Standard Instrument Departure (SID) routes, Departure Procedures (DP), terminal procedures, approach plates, and the like. In an exemplary embodiment, the display system 110, the processing system 108 and/or the FMS 116 are cooperatively configured to render and/or display aircraft procedure information for an identified aircraft action on the display device 102, as described in greater detail below.

In an exemplary embodiment, the processing system 108 is coupled to the navigation system 114, which is configured to provide real-time navigational data and/or information regarding operation of the aircraft 130. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 130, that is, the current location of the aircraft 130 (e.g., the current latitude and longitude) and the current altitude or above ground level for the aircraft 130. The navigation system 114 is also capable of obtaining or otherwise determining the heading of the aircraft 130 (i.e., the direction the aircraft is traveling in relative to some reference).

The processing system 108 is also coupled to the communications system 112, which is configured to support communications to and/or from the aircraft 130. The communications system 112 is suitably configured to support communications between the aircraft 130 and air traffic control or another suitable command center or ground location. In this regard, the communications system 112 may be realized using a radio communication system or another suitable data link system. As described in greater detail below, the communications system 112 facilitates communications between the processing system 108 onboard the aircraft 130 and a server 140 located outside the aircraft 130. For example, the server 140 may be maintained by an airline or business that owns and/or operates the aircraft 130 and located at an airline operations center on the ground. The server 140 may be maintained and owned by a business, government entity or a third party service provider.

The processing system 108 is also coupled to the FMS 116. In an exemplary embodiment, the FMS 116 maintains information pertaining to a flight plan for the aircraft 130. The FMS 116 is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 130 to the processing system 108. Although FIG. 1 depicts a single avionics system 118, in practice, the system 100 and/or aircraft 130 will likely include numerous avionics systems for obtaining and/or providing real-time flight-related information that may be displayed on the display device 102 or otherwise provided to a user (e.g., a pilot, a co-pilot, or crew member). For example, practical embodiment of the system 100 and/or aircraft 130 will likely include one or more of the following avionics systems suitably configured to support operation of the aircraft 130: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In an exemplary embodiment, the FMS 116 (or another avionics system 118) is configured to determine, track, or otherwise identify the current flight phase of the aircraft 130. As used herein, a flight phase of the aircraft 130 should be understood as a distinguishable segment of the operation (or distinguishable operating phase) of the aircraft 130 associated with traversing the aircraft 130 from a starting location to an ending location. For example, operation of the aircraft 130 from a starting location (e.g., a terminal at a first airport) to an ending location (e.g., a terminal at a second airport) usually comprises a plurality of flight phases, such as, for example, a standing phase (e.g., when the aircraft is stationary on the ground), a pushback or towing phase (e.g., when the aircraft is moving on the ground with assistance), a taxiing phase, a takeoff phase, a climbing phase (e.g., including the initial climb and/or climb to cruise), a cruising phase, a descent phase (e.g., from cruise altitude to initial approach), an approach phase, a landing phase, a rollout phase, and the like. Various phases of flight are well known, and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases.

In addition to delineated flight phases, the FMS 116 may identify other operating states of the aircraft 130, such as, for example, operation with one or more engines disabled, operation when afterburners onboard the aircraft 130 are being utilized, transonic and/or supersonic operation of the aircraft 130, and the like. For example, the FMS 116 may identify the current aircraft configuration status of the aircraft 130, including information such as the current flap configuration, engine revolutions per minute, aircraft speed, aircraft pitch, aircraft yaw, aircraft roll, fuel flow, fuel quantity, fuel remaining, and the like. Additionally, the FMS 116 may identify or otherwise determine environmental conditions at or near the current location of the aircraft 130, such as, for example, the current temperature, wind speed, wind direction, atmospheric pressure, turbulence, and the like. The FMS 116 may also identify optimized speeds (e.g., ECON speed, RANGE speed, or the like), distance(s) remaining, time remaining, cross track deviation, navigational performance parameters, and other travel parameters that may be displayed on the display device 102 or utilized as display criteria, as described in greater detail below.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the audio output device 106 as being located onboard the aircraft 130 (e.g., in the cockpit), in practice, one or more of the display device 102, the user input device 104, and/or the audio output device 106 may be located outside the aircraft 130 (e.g., on the ground as part of an air traffic control center or another command center) and communicatively coupled to the remaining elements of the system 100 (e.g., via a data link and/or communications system 112). Similarly, in some embodiments, the data storage element 120 may be located outside the aircraft 130 (e.g., on server 140) and communicatively coupled to the processing system 108 via a data link and/or communications system 112. Furthermore, practical embodiments of the system 100 and/or aircraft 130 will include numerous other devices and components for providing additional functions and features, as will be appreciated in the art. In this regard, it will be appreciated that although FIG. 1 shows a single display device 102, in practice, additional display devices may be present onboard the aircraft 130.

Figure 2:
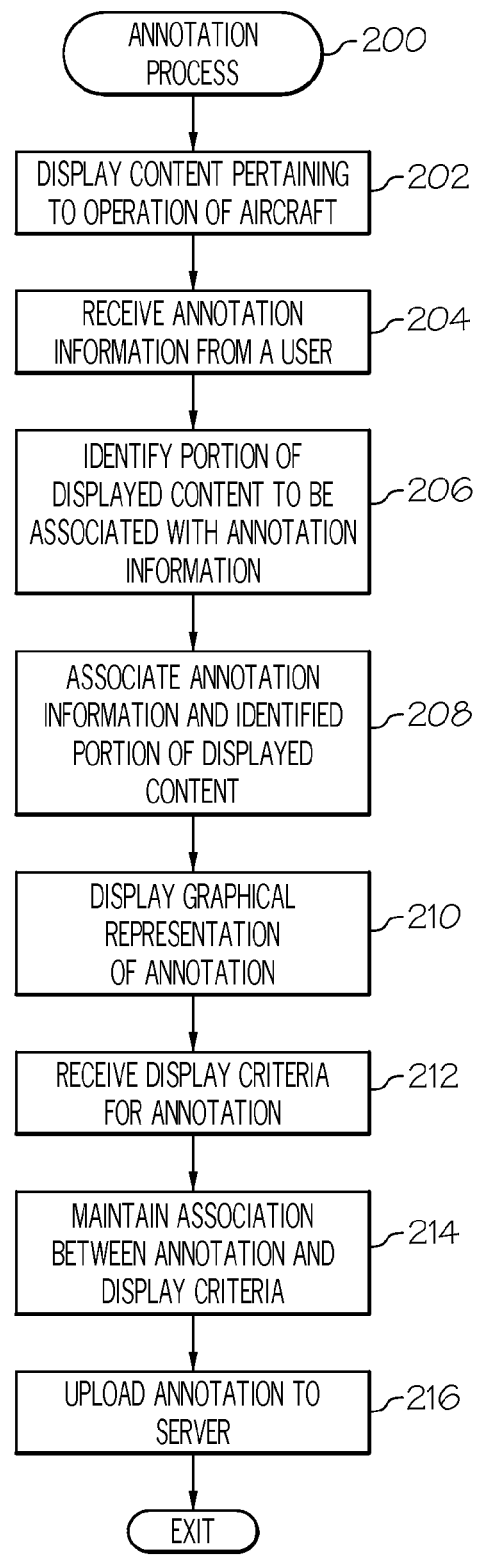
FIG. 2 is a flow diagram of an exemplary annotation process suitable for use with the system of FIG. 1 in accordance with one embodiment.

Referring now to FIG. 2, in an exemplary embodiment, the system 100 may be configured to perform an annotation process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the user input device 104, the audio output device 106, the processing system 108, the display system 110, the communications system 112, the navigation system 114, the FMS 116, the avionics system(s) 118, and/or the data storage element 120. It should be appreciated that any number of additional or alternative tasks may be included, and may be incorporated into a more comprehensive procedure or process having additional functionality not described in detail herein.

Referring again to FIG. 2, and with continued reference to FIG. 1, an annotation process 200 may be performed to create or otherwise define annotations for subsequent display on a display device associated with an aircraft. In an exemplary embodiment, the annotation process 200 initializes by displaying content comprising one or more objects, images, or other graphical representations of information pertaining the operation of an aircraft on a display device associated with the aircraft (task 202). For example, the display system 110 and/or processing system 108 may be cooperatively configured to display one or more of the following types of content on the display device 102: a navigational map, a vertical profile display, an aircraft systems display, an aircraft configuration display, a radio frequency tuning display, a flight controls display, a weather display, an air traffic display, or procedural information regarding the general operation of the aircraft 130, such as, procedural information regarding operation of the engine systems, de-icing systems, hydraulics systems, and the like. It should be appreciated that although the subject matter may be described herein in the context of a navigational map or other particular types of displayed content, the subject matter is not intended to be limited to a particular type of content displayed on the display device, and in practice, the annotation process 200 may be implemented with other types of content than those explicitly recited herein.

Figure 3:
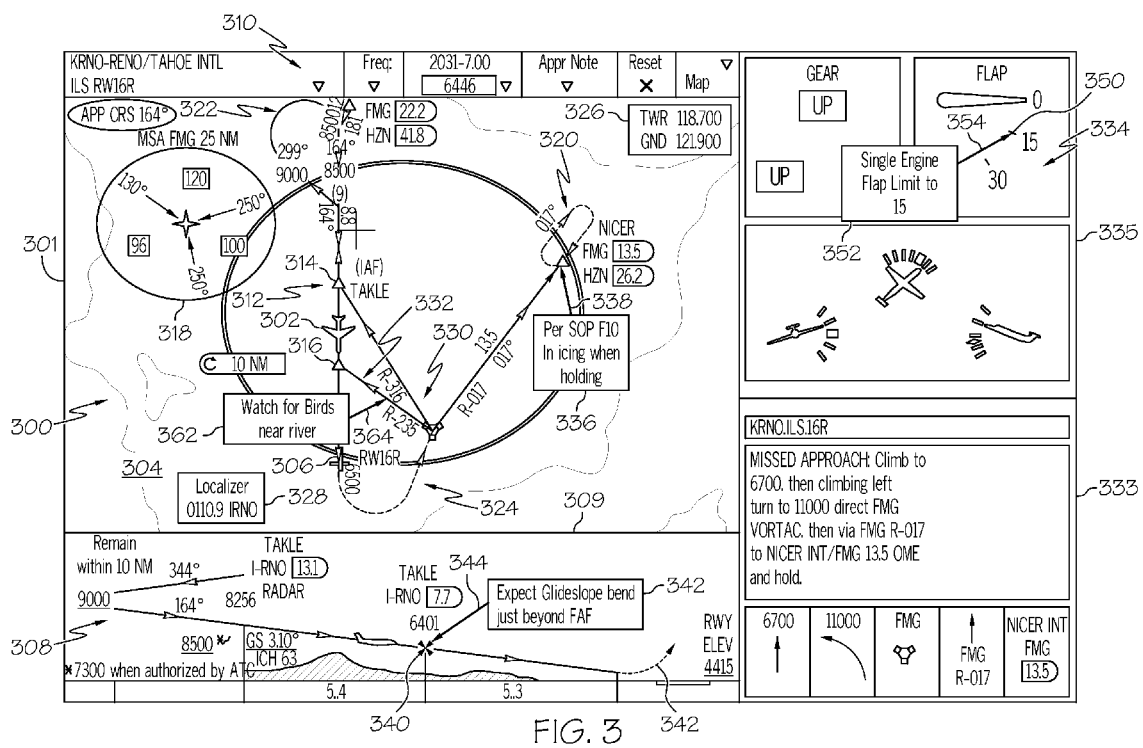
FIG. 3 is a schematic view of an exemplary navigational map suitable for use with the annotation process of FIG. 2 in accordance with one embodiment.

For example, referring now to FIG. 3, and with continued reference to FIG. 1 and FIG. 2, the annotation process 200 may display and/or render a navigational map 300 associated with a current (or instantaneous) location of an aircraft in a window 301 (e.g., a navigational map window) on a display device 102 onboard the aircraft 130. As used herein, a window should be understood as referring to a visual area containing graphical representations or images associated with one or more computing processes or programs being executed by the processing system 108 and/or FMS 116. In this regard, the display system 110 and/or processing system 108 are configured to render a graphical representation of the aircraft 302 on the navigational map 300, which may be overlaid or rendered on top of a background 304. The background 304 may be a graphical representation of the terrain, topology, or other suitable items or points of interest corresponding to (or within a given distance of) a location of the aircraft 130, which may be maintained by the display system 110 in a terrain database, a navigational database, a geopolitical database, or another suitable database. For example, as illustrated in FIG. 3, the display system 110 may render a graphical representation of an airport 306 overlying the background 304. Although not illustrated in FIG. 3, some embodiments of navigational map 300 may include graphical representations of airspace designations and/or airspace restrictions, cities, towns, roads, railroads, and other geo-political information. In addition to the navigational map 300, the annotation process 200 may also display and/or render a vertical profile 308 associated with navigational map 300 in a second window 309 on the display device 102 adjacent to and/or overlying a bottom portion of the navigational map 300, as described in greater detail below. Additionally, the annotation process 200 may display and/or render additional content pertaining to operation of the aircraft 130 in additional windows 333, 335 on the display device 102, as described in greater detail below.

Although FIG. 3 depicts a top view (e.g., from above the aircraft 302) of the navigational map 300, in practice, alternative embodiments may utilize various perspective views, such as side views, three-dimensional views (e.g., a three-dimensional synthetic vision display), angular or skewed views, and the like. Further, depending on the embodiment, the aircraft 302 may be shown as traveling across the navigational map 300, or alternatively, as being located at a fixed position on the navigational map 300, and FIG. 3 is not intended to limit the scope of the subject matter in any way. In an exemplary embodiment, the navigational map 300 is associated with the movement of the aircraft, and the background 304 refreshes or updates as the aircraft travels, such that the graphical representation of the aircraft 302 is positioned over the terrain background 304 in a manner that accurately reflects the current (e.g., instantaneous or substantially real-time) real-world positioning of the aircraft 130 relative to the earth. In accordance with one embodiment, the navigational map 300 is updated or refreshed such that it is centered on and/or aligned with the aircraft 302. Although the navigational map 300 shown in FIG. 3 is oriented north-up (i.e., moving upward on the navigational map 300 corresponds to traveling northward), as described below, in other embodiments, the navigational map 300 may be oriented track-up or heading-up, i.e., aligned such that the aircraft 302 is always traveling in an upward direction and the background 304 adjusted accordingly.

In an exemplary embodiment, the annotation process 200 displays aircraft procedure information for operating the aircraft 130 on the navigational map 300. As shown in FIG. 3, the display system 110 and/or processing system 108 may display instrument approach procedure information for executing an identified instrument approach at airport 306. In this regard, the annotation process 200 may identify airport 306 as a desired airport for landing the aircraft 130, for example, in response to a user manipulating the user input device 104 to select or otherwise indicate the airport 306 on the navigational map 300 or based on the final entry (or destination) of a flight plan maintained by FMS 116. The annotation process 200 may then identify a desired approach for the airport 306. As used herein, an approach should be understood as referring to a predefined flight path or other guidance intended to facilitate a safe landing for an aircraft at a particular runway, landing strip, airstrip, another suitable landing location, or a set of landing locations. In some embodiments, the annotation process 200 may identify a default approach (e.g., the most commonly used approach or the most recently used approach) for use as the desired approach. In other embodiments, the annotation process 200 determines and/or identifies the desired approach based on the current heading and/or location of the aircraft 130. For example, the annotation process 200 may identify the approach with a final approach course most closely aligned with the current heading of the aircraft 130 as the desired approach. In yet another embodiment, the annotation process 200 may identify or otherwise determine the desired approach based on an input from a user via user input device 104. It should be appreciated that although the subject matter may described herein in the context of an instrument approach procedure for purposes of explanation, the subject matter is not intended to be limited to an approach procedure, and in practice, the subject matter may be implemented for departures or other aircraft actions having aircraft procedure information displayed on display device 102 in a similar manner as described below.

In response to identifying the desired approach for the airport 306, the annotation process 200 renders and/or displays a graphical representation of the aircraft procedure information for the desired approach on the display device 102 and/or navigational map 300. In this regard, in some embodiments, the annotation process 200 displays and/or renders a vertical profile 308 associated with the identified approach in a window 309 adjacent to and/or overlying a portion of the navigational map 300. The vertical profile 308 (or alternatively, a vertical profile display or vertical situation display) comprises a graphical representation of the altitude profile for a portion of the approach that is concurrently displayed on the navigational map 300. The vertical profile 308 may be of the type described in U.S. patent application Ser. No. 12/427,521, filed on Apr. 21, 2009 and entitled "METHODS AND SYSTEMS FOR DISPLAYING A VERTICAL PROFILE FOR AN AIRCRAFT PROCEDURE WITH NONUNIFORM SCALING," which is assigned to the assignee of the present application and incorporated by reference herein. The annotation process 200 may also render or otherwise display a briefing panel 310 that includes a portion of the instrument procedure information for the identified approach in the navigational map window 301 overlying a portion of the navigational map 300. The briefing panel 310 may be of the type described in U.S. patent application Ser. No. 12/340,188, filed on Dec. 19, 2008 and entitled "METHODS FOR DISPLAYING AIRCRAFT PROCEDURE INFORMATION," which is assigned to the assignee of the present application and incorporated by reference herein.

In addition to the vertical profile 308 and the briefing panel 310, the graphical representation of the aircraft procedure information for the identified approach also includes one or more displayed objects, such as, for example, graphical representations of an approach course 312, minimum sector altitudes 318 for the approach, a holding pattern 320 for the approach, radio frequency information 326 for the approach, and localizer information 328 for the approach. The annotation process 200 may also display and/or render additional aircraft procedure information for the identified approach in window 333. The approach course 312 comprises a prescribed flight path for the aircraft 130 that traverses one or more reference points 314, 316 en route to the airport 306. Depending on the particular approach and/or airport, the navigational reference points may comprise navigational aids, such as VHF omni-directional ranges (VORs), distance measuring equipment (DMEs), tactical air navigation aids (TACANs), and combinations thereof (e.g., VORTACs), the landing and/or departure location (e.g., the runway) or other features on the ground, as well as position fixes (e.g., initial approach fixes (IAFs) and/or final approach fixes (FAFs)) and other navigational reference points used in area navigation (RNAV). The approach course 312 also includes graphical representations of procedure turns 322, 324 for the missed approach, along with additional procedure information, such as bearing markers 330, 332 of a procedure turn 324, altitude criteria (e.g., minimum descent altitudes) along the approach course 312, and other procedure information for executing the approach. In this regard, bearing markers 330, 332 represent prescribed headings (or bearings) from a waypoint corresponding to an endpoint of a procedure turn 324.

In addition to windows 301, 309, 333, the annotation process 200 may also display and/or render an aircraft configuration display 334 including information associated with the current configuration of the aircraft 130 in another window 335 on the display device 102. In this regard, the display system 110 and/or processing system 108 are configured to render a graphical representation of the current landing gear configuration, flap configuration, pitch, yaw, and roll of the aircraft 130 based on information received from the FMS 116 and/or avionics system(s) 118.

Referring again to FIG. 2, and with continued reference to FIG. 1 and FIG. 3, in an exemplary embodiment, the annotation process 200 continues by receiving information for an annotation to be added to the displayed content from a user (task 204). In this regard, the annotation information comprises linguistic information pertaining to operation of the aircraft that is provided by a user and received by the processing system 108 via user input device 104, and is not provided by a governmental body, a standards organization, or the onboard avionics 110, 112, 114, 116, 118. For example, the user may manipulate a keyboard, a keypad, a touchscreen, or the like, to provide textual annotation information that is received by processing system 108. In other embodiments, the processing system 108 may receive audio annotation information from an audio input device, such as a microphone or headset. In an exemplary embodiment, the annotation process 200 receives an indication of a desire to add an annotation to the displayed content. For example, a graphical user interface element (such as a button) may be provided on the display device 102 to allow a user to enable annotating the displayed content, wherein the user may manipulate the user input device 104 to position a cursor or pointer over the graphical user interface element and select or otherwise identify the graphical user interface element to enable annotating the displayed content. In other embodiments, the user may manipulate the user input device 104 to position a cursor or pointer over a portion of the displayed content to be annotated and select or otherwise identify the portion of the displayed content to be annotated while simultaneously enabling annotation the displayed content. In yet other embodiments, if the user input device 104 comprises an user input device 104, the system 100 may support a voice command to enable annotating the displayed content, wherein the annotation process 200 receives indication of a desired to annotate the displayed content in response to the processing system 108 identifying the voice command being provided by the user via the user input device 104. After annotation of the displayed content is enabled, the processing system 108 receives the annotation information for the annotation from the user input device 104.

In an exemplary embodiment, the annotation process 200 continues by identifying the portion of the displayed content to be associated with the annotation information and associating the annotation information and the portion of the displayed content (tasks 206, 208). For example, the user may manipulate the user input device 104 to position a cursor or pointer over an object displayed on the display device 102, and select or otherwise identify the displayed object underlying the cursor as the portion of the displayed content to be associated with the annotation information. The processing system 108 and data storage element 120 are cooperatively configured to store the annotation information and maintain an association between the stored annotation information and an identifier corresponding to the identified portion of the displayed content (e.g., an identifier corresponding to the displayed object). In some embodiments, if the annotation information comprises audio information received via user input device 104, the processing system 108 and/or data storage element 120 may record the audio of the user providing the annotation information for subsequent playback, as described below.

For example, referring now to FIG. 3, a user may indicate a desire to add an annotation to the navigational map 300 by manipulating the user input device 104 to position a cursor or pointer over a portion of the aircraft procedure information displayed on the navigational map that the user would like to annotate, such as, the holding pattern 320. After selecting or otherwise identifying the holding pattern 320, the processing system 108 enables annotation of the navigational map 300 and receives the annotation information from the user via user input device 104. The user may then provide information pertaining to operating the aircraft 130 when executing the holding pattern 320 or otherwise operating the aircraft 130 in the vicinity of the holding pattern 320. For example, as shown, the user may provide annotation information to remind him or her to put the flaps of the aircraft 130 at ten degrees per standard operating procedures when executing the holding pattern 320 in icing conditions. After the annotation information is provided, the processing system 108 and/or data storage element 120 stores the annotation information and maintains the association between the annotation information and the holding pattern 320.

Referring again to FIG. 2, in an exemplary embodiment, the annotation process 200 continues by displaying a graphical representation of the annotation on the display device (task 210). In an exemplary embodiment, the annotation process 200 graphically displays the annotation information on the display device 102 proximate the displayed content associated with the annotation information. In this regard, the graphical representation of the annotation information on the display device 102 is positioned on the display device 102 relative to its associated displayed content. In other embodiments, in lieu of displaying the annotation information, the annotation process 200 may display a graphical indicator, such as an icon or another graphical element, on the display device 102 proximate the displayed content associated with the annotation, wherein a graphical representation of the annotation information may be subsequently displayed in response to a user selecting or otherwise indicating the graphical indicator.

For example, referring again to FIG. 3 and with reference to FIG. 2, in accordance with one embodiment, the processing system 108 and/or display system 110 is configured to displaying a graphical representation of the annotation information 336 at a location within the currently displayed area of the navigational map 300 that is proximate the holding pattern 320. In an exemplary embodiment, the processing system 108 and/or display system 110 are configured to automatically reposition the graphical representation of the annotation information 336 relative to the holding pattern 320. In this regard, the positioning of the annotation information 336 relative to the holding pattern 320 may vary as the aircraft 130 travels. For example, the processing system 108 and/or display system 110 may be configured to dynamically reposition and/or resize the annotation information 336 to maintain the annotation information 336 within the currently displayed area of the navigational map 300 as long as the holding pattern 320 is displayed on the navigational map 300 without obscuring the aircraft 302, the airport 306, or other portions of the displayed procedure information 308, 310, 312, 318, 320, 322, 324, 326, 328, 332, 334. In this manner, the positioning of the annotation information 336 may vary with respect to the terrain background 304. In an exemplary embodiment, the annotation process 200 is configured to graphically indicate the association between the user-defined annotation information 336 and the holding pattern 320, for example, by rendering and/or displaying an arrow 338 or another graphical element to graphically connect or otherwise graphically associate the annotation information 336 and the holding pattern 320.

In an exemplary embodiment, the annotation process 200 continues by receiving or otherwise obtaining display criteria for the annotation (task 212). As described in greater detail below in the context of FIG. 4, the display criteria are utilized by the system 100 to control subsequent display of the annotation information by restricting the display of the annotation information to particular operating conditions for the aircraft 130. For example, the display criteria may include a flight phase criterion which limits and/or otherwise restricts the flight phase(s) for the aircraft 130 during which the annotation information is displayed on the display device 102. In this regard, if the current flight phase of the aircraft 130 does not satisfy the flight phase criterion associated with a particular annotation, the annotation information for that annotation is not displayed on the display device 102. Conversely, when the current flight phase of the aircraft 130 satisfies the flight phase criterion associated with a particular annotation, the annotation information is displayed on the display device 102. In this regard, the current flight phase of the aircraft 130 satisfies the flight phase criterion when the current flight phase corresponds to (or matches) the flight phase criterion. In addition to a flight phase criterion, the display criteria for the annotation information may also include altitude-based criterion (e.g., above a threshold altitude, below a threshold altitude, within a range of altitudes, etc.), speed-based criterion (e.g., above a threshold speed, below a threshold speed, within a range of speeds, etc.), distance-based criterion (e.g., within a particular distance of the object associated with the annotation), time-based criterion (e.g., estimated travel time for reaching a particular reference location is less than a threshold amount of time), aircraft configuration criterion, directional criterion (e.g., the aircraft is located in a particular direction relative to a particular reference location), environmental criterion (e.g., temperatures above/below a particular temperature, winds above/below a particular value, winds out of a particular direction), or other user-specific or aircraft-specific criterion. In some embodiments, the annotation process 200 may display or otherwise present a graphical user interface (e.g., on the display device 102) that allows the user to provide his or her desired display criteria for the particular annotation. For example, the annotation process 200 may render or otherwise display a list or menu comprising a plurality of possible categories or types of display criteria (e.g., flight phase criterion, altitude-based criterion, speed-based criterion, distance-based criterion, time-based criterion, aircraft configuration criterion, environmental criterion, and the like), and the user may select one or more particular categories or types of display criteria from the graphical list and then enter values or parameters for the selected display criteria.

For example, referring again to FIG. 3, the user may identify or otherwise specify flight phase criterion for the annotation information 336 such that the annotation information 336 is only displayed when the phase of flight for the aircraft 130 corresponds to either a holding flight phase or a missed approach flight phase. Additionally, the user may identify distance criterion for the annotation information 336 such that the annotation information 336 is only displayed when the current location of the aircraft 130 is a certain distance from the airport 306 or within a certain distance of the holding pattern 320. Similarly, the user may identify altitude criterion for the annotation information 336 such that the annotation information 336 is only displayed when the current altitude of the aircraft 130 is above/below a particular altitude. The user may also provide environmental criterion for the annotation information 336 such that the annotation information 336 is only displayed when the temperatures are below 32° Fahrenheit, or in other words, the annotation information 336 is only displayed in icing conditions.

Referring again to FIG. 2, in an exemplary embodiment, the annotation process 200 maintains the association between the display criteria and the particular annotation (task 214). In this regard, the processing system 108 and data storage element 120 are cooperatively configured to store the display criteria such that the data storage element 120 maintains an association between the display criteria, its corresponding annotation information, and the displayed object associated with the annotation information. In accordance with one or more embodiments, the annotation process 200 continues by uploading the annotation (task 216). In some embodiments, the annotation information along with its associated display criteria and an identifier for its associated displayed object may be uploaded (or uplinked) from the processing system 108 and/or data storage element 120 to the server 140 via the communications system 112. In this manner, the server 140 may back up the annotations stored onboard the aircraft 130, as well as facilitate collaborating or otherwise combining annotations from multiple users and/or multiple aircraft and updating data storage element 120 with additional annotations, as described in greater detail below in the context of FIG. 4. In other embodiments, the annotation information along with its associated display criteria and an identifier for its associated displayed object may be uploaded from the processing system 108 and/or data storage element 120 to a computer-readable media, such as a portable data storage device (e.g., a memory card or a data disc), that may be maintained by the pilot of the aircraft 130.

The annotation process 200 may be repeated indefinitely to enable any number of annotations to be made during operation of the system 100. For example, referring again to FIG. 3, the user may indicate a desire to add an annotation to the vertical profile 308 by manipulating the user input device 104 to position a cursor or pointer over a portion of the vertical profile 308 that the user would like to annotate, such as the graphical representation of the final approach fix 340 (or the intersection of the approach course and the final approach fix) for the identified approach. After selecting or otherwise identifying the final approach fix 340, the user may then provide information pertaining to operating the aircraft 130 when executing the approach. For example, as shown, the user may provide annotation information to remind him or her to expect the glideslope signal to bend shortly after traversing the final approach fix. The annotation process 200 stores the annotation information and maintains the association between the annotation information and the final approach fix 340, and displays a graphical representation of the annotation information 342 on the vertical profile 308 with an arrow 344 indicating the association between the annotation information 342 and the final approach fix 340. As described above, the user may also provide display criteria to control subsequent display of the annotation information 342. For example, the user may identify or otherwise specify flight phase criterion for the annotation information 342 such that the annotation information 342 is only displayed when the flight phase for the aircraft 130 corresponds to the approach phase. Additionally, the user may identify distance criterion and/or altitude criterion for the annotation information 342 such that the annotation information 342 is only displayed when the current location of the aircraft 130 is within a certain distance of the final approach fix 340 and/or below a certain altitude (or above ground level).

In a similar manner, the user may indicate a desire to add an annotation to the aircraft configuration display 334 by manipulating the user input device 104 to position a cursor or pointer over a portion of the content displayed in window 335 that the user would like to annotate, such as a marker 350 that corresponds to the angle of the flaps of the aircraft 130 being configured at fifteen degrees. After selecting or otherwise identifying marker 350, the user may then provide information pertaining to operating the flaps of the aircraft 130. For example, as shown, the user may provide annotation information to remind him or her not to command the flaps to exceed an angle of fifteen degrees when operating the aircraft 130 in a single-engine operating mode. The annotation process 200 stores the annotation information and maintains the association between the annotation information and the marker 350, and displays a graphical representation of the annotation information 352 on the aircraft configuration display 334 with an arrow 354 indicating the association between the annotation information 352 and the marker 350. As described above, the user may also provide display criteria to control subsequent display of the annotation information 352. For example, the user may identify or otherwise specify aircraft configuration criterion for the annotation information 352 such that the annotation information 352 is only displayed when the FMS 116 and/or avionics system 118 identifies the aircraft 130 is in a single-engine operating mode.

As illustrated in FIG. 3, in a similar manner, the user may indicate a desire to add an annotation to the navigational map 300 by manipulating the user input device 104 to position a cursor or pointer over the bearing marker 332 from the endpoint of the procedure turn 324. After selecting or otherwise identifying the bearing marker 332, the user may then provide information pertaining to operating the aircraft 130 when executing the procedure turn 324 to reverse the course of the aircraft 130. For example, as shown, the user may provide annotation information to remind him or her to watch for birds near a river on the ground when flying the aircraft 130 in the direction of the bearing marker 332 from the endpoint of the procedure turn 324. The annotation process 200 stores the annotation information and maintains the association between the annotation information and the bearing marker 332, and displays a graphical representation of the annotation information 362 on the navigational map 300 with an arrow 364 indicating the association between the annotation information 362 and the bearing marker 332. As described above, the user may also provide display criteria to control subsequent display of the annotation information 362. For example, the user may identify or otherwise specify a flight phase criterion for the annotation information 362 such that the annotation information 362 is only displayed when the flight phase for the aircraft 130 corresponds to the missed approach phase.

Figure 4:
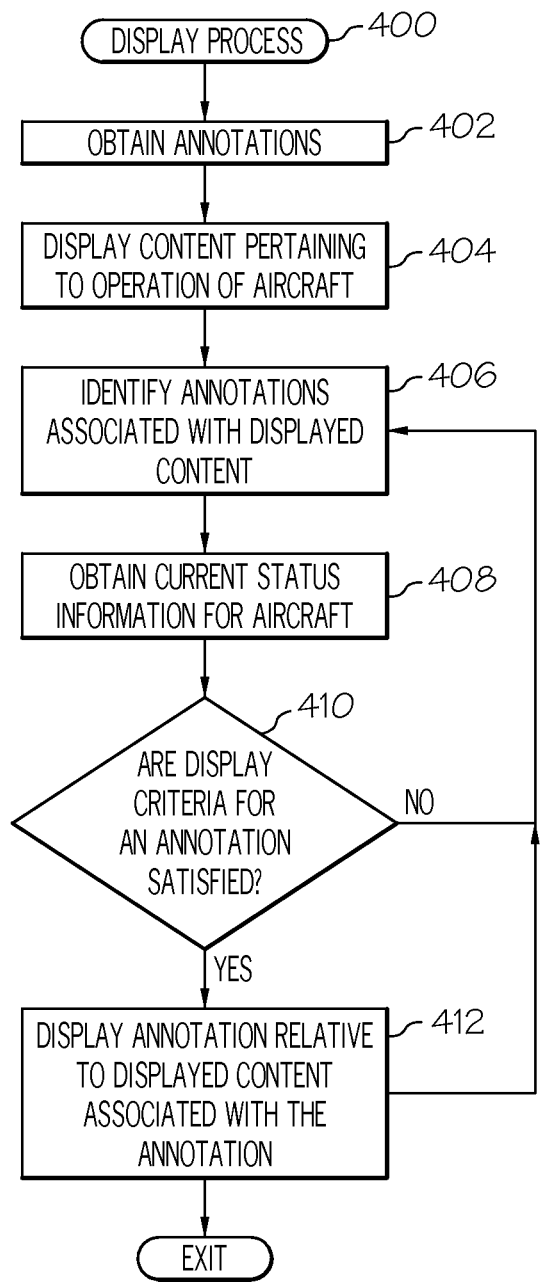
FIG. 4 is a flow diagram of an exemplary display process suitable for use with the system of FIG. 1 in accordance with one embodiment.

Referring now to FIG. 4, in an exemplary embodiment, the system 100 may be configured to perform a display process 400 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the display device 102, the user input device 104, the audio output device 106, the processing system 108, the display system 110, the communications system 112, the navigation system 114, the FMS 116, the avionics system(s) 118, and/or the data storage element 120. It should be appreciated that any number of additional or alternative tasks may be included, and may be incorporated into a more comprehensive procedure or process having additional functionality not described in detail herein.

Referring again to FIG. 4, and with continued reference to FIGS. 1-3, a display process 400 may be performed to present annotations on a display device associated with an aircraft. In an exemplary embodiment, the display process 400 begins by obtaining any available annotations for the aircraft that may be subsequently displayed (task 402). In this regard, in addition to annotations maintained locally onboard the aircraft 130 by data storage element 120 as described above, the processing system 108 may obtain, via communications system 112, any other annotations that may be displayed by aircraft 130. For example, in accordance with one embodiment, the processing system 108 may access the server 140 download annotations from the server 140 to the data storage element 120. In this regard, the server 140 may be updated periodically by airline staff with various annotations that comprise airline company notes, notices to airmen (NOTAMs), pilot reports (PIREPS), or other annotation information that is not maintained onboard the aircraft 130 by the FMS 116 and/or data storage element 120. Additionally, the server 140 may include annotations that were previously uplinked from another aircraft having the same make and model as aircraft 130, annotations that were previously uplinked from another aircraft that were made by the current pilot (or co-pilot) of aircraft 130, or annotations made by other pilots and/or co-pilots while operating aircraft 130. The processing system 108 may also obtain any other annotations that may be displayed by aircraft 130 from computer-readable media, such as a memory card or data disc, maintained and/or provided by the pilot. In this manner, a pilot may maintain his or her own annotations when operating among various aircraft and import his or her own annotations before operating an aircraft the pilot has not previously operated.

In an exemplary embodiment, the display process 400 continues by displaying content pertaining to operation of an aircraft on a display device associated with the aircraft and identifying any possible annotations that are associated with a portion of the content currently displayed on the display device (task 404, 406). In this regard, the display system 110 and/or processing system 108 are cooperatively configured to display content on the display device 102, as described above in the context of FIG. 2 (e.g., task 202). In an exemplary embodiment, the processing system 108 is configured to identify annotations associated with the displayed content by evaluating the identifiers associated with the annotations to determine which objects or information currently displayed on the display device 102 have corresponding annotations. For example, referring again to FIG. 3, the processing system 108 may evaluate the identifiers for the annotations maintained by data storage element 120 to identify any annotations associated with objects or information displayed in any of the windows 301, 309, 333, 335, such as, for example, the airport 306, vertical profile 308, briefing panel 310, approach course 312, reference points 314, 316, minimum sector altitudes 318, holding pattern 320, procedure turns 322, 324, radio frequency information 326, localizer information 328, bearing markers 330, 332, final approach fix 340, or marker 350. In this example, the processing system 108 identifies the annotation associated with the holding pattern 320 as a first annotation associated with the currently displayed content, the annotation associated with the final approach fix 340 as a second annotation associated with the currently displayed content, and the annotation associated with the marker 350 as a third annotation associated with the currently displayed content. In this regard, the annotations are not geo-referenced or associated with a fixed location, but rather, are associated with and referenced from the displayed content (e.g., the displayed objects or information). Thus, an annotation is not displayed if its associated content is not displayed. For example, if the aircraft 130 is in the vicinity of airport 306 but approach procedure information for airport 306 is not displayed (e.g., because the aircraft 130 is not flying into airport 306), then the annotations associated with the procedure information (e.g., the annotations associated with the holding pattern 320 and final approach fix 340) will not be identified and/or displayed, even though other display criteria may be satisfied as described in greater detail below.

Referring again to FIG. 4, in an exemplary embodiment, the display process 400 continues by obtaining current status information for the aircraft (task 408). In this regard, the processing system 108 obtains (e.g., from FMS 116, navigation system 114 and/or other avionic systems 118) one or more of the following: the current flight phase for the aircraft 130, the current location of the aircraft 130 (or a particular distance from a navigational reference point or a desired track), the current altitude (or above ground level) of the aircraft 130, the current heading (or bearing) of the aircraft 130, the current ground speed of the aircraft 130, the current rate of climb of the aircraft 130, the current navigation performance parameters for the aircraft 130 (e.g., the current cross-track deviation), the current environmental conditions proximate the aircraft 130 (e.g., temperature at the current location and altitude of the aircraft 130, the wind speed and/or direction at the current location and altitude of the aircraft 130, the turbulence at the location and altitude of aircraft 130), and the current aircraft configuration status (e.g., engine status, flap configuration, aircraft alpha and/or beta angle(s), pitch angle, yaw angle).

After obtaining the current status information for the aircraft, the display process 400 continues by determining, for each annotation identified as being associated with currently displayed content, whether the display criteria associated with that respective annotation has been satisfied (task 410). If the display criteria for a respective annotation are satisfied, the display process 400 automatically displays a graphical representation of that annotation on the display device relative to its associated displayed content (task 412). In this regard, for each annotation identified above (task 406), the processing system 108 is configured to evaluate each display criterion to ensure each display criterion is satisfied before that respective annotation is displayed. If the display criteria for a particular annotation are not satisfied, that annotation is not displayed, and the display process 400 continues by evaluating the display criteria for the remaining annotations associated with displayed content.

In an exemplary embodiment, the display process 400 automatically displays a graphical representation of the annotation information for a respective annotation on the display device 102 when the display criteria for that respective annotation are satisfied. Additionally, in some embodiments, the display process 400 may provide audio feedback corresponding to the annotation information. In this regard, the audio feedback may be provided contemporaneously and/or simultaneously with the display of the annotation information. For example, the processing system 108 may be configured to provide speech synthesis to provide the annotation information audibly via audio output device 106 in addition to displaying the annotation information on the display device 102. Alternatively, if the data storage element 120 maintained and/or stored an audio recording of the annotation information being provided as described above, the processing system 108 may playback the audio recording via audio output device 106. In other embodiments, in lieu of displaying the annotation information, the annotation process 200 may display a graphical indicator, such as an icon or another graphical element, on the display device 102 proximate the displayed content associated with the annotation, wherein a graphical representation of the annotation information may be subsequently displayed and/or audible feedback of the annotation information provided in response to a user selecting or otherwise indicating the graphical indicator.

For example, referring again to FIG. 3, the processing system 108 may evaluate the display criteria for the first annotation associated with the holding pattern 320 before the annotation information 336 is displayed on the navigational map 300. As described above, the processing system 108 may compare the current flight phase of the aircraft 130 to a flight phase criterion associated with annotation information 336 to verify the flight phase criterion is satisfied. In this example, if the aircraft 130 is in a missed approach or holding flight phase, the flight phase criterion is satisfied, and the processing system 108 may continue by determining whether the distance between the current location of the aircraft 130 and the holding pattern 320 is less than a threshold value. If the distance between the current location of the aircraft 130 and the holding pattern 320 is less than the threshold value, the processing system 108 may determine whether the temperature at the current location of the aircraft 130 is less than 32° Fahrenheit. In this manner, the annotation information 336 is automatically displayed on the navigational map 300 only when the aircraft 130 is in the missed approach or holding flight phase and within a predetermined distance of the holding pattern 320 during icing conditions, and otherwise, is not displayed on the navigational map 300. As described above, when displayed, the annotation information 336 is displayed at a location proximate the holding pattern 320 and the annotation information 336 may be automatically repositioned relative to the holding pattern 320 as long as the display criteria remain satisfied.

In a similar manner, the processing system 108 may evaluate the display criteria for the second annotation associated with the final approach fix 340. As described above, the processing system 108 may compare the current flight phase of the aircraft 130 to a flight phase criterion associated with annotation information 342 to verify the flight phase criterion is satisfied. In this example, if the aircraft 130 is in an approach phase, the flight phase criterion is satisfied, and the processing system 108 may continue by determining whether the distance between the current location of the aircraft 130 and the final approach fix 340 is less than a threshold value and/or whether the current altitude of the aircraft 130 is below a threshold value. In this manner, the annotation information 342 is automatically displayed on the vertical profile 308 only when the aircraft 130 is in the approach phase and the current location of the aircraft 130 is within a certain distance of the final approach fix 340 and/or below a certain altitude (or above ground level). Similarly, for the third annotation associated with marker 350, the processing system 108 may compare the current aircraft configuration with the aircraft configuration criterion associated with the annotation information 352, such that the annotation information 352 is automatically displayed only when the aircraft 130 is operating in a single-engine mode. For the fourth annotation associated with bearing marker 332, the processing system 108 may compare the current flight phase of the aircraft 130 to the flight phase criterion associated with annotation information 362, such that the annotation information 362 is automatically displayed only when the aircraft 130 is in a missed approach flight phase.

Referring again to FIG. 4, in an exemplary embodiment, the loop defined by tasks 406, 408, 410, 412 are repeated during operation of the system 100. In this regard, the display process 400 may dynamically update to ensure that relevant annotations are validly displayed. For example, if the displayed content is updated such that an object or item having an annotation is no longer displayed on the display device 102 (e.g., in the case of a navigational map being updated or scrolling), that annotation may be removed from the display device 102. Additionally, as the status information for the aircraft 130 changes during flight, the display process 400 repeatedly identifies annotations associated with the displayed content and reevaluates their corresponding display criteria, thereby allowing annotations to be added or removed from the display device 102 based on their associated display criteria to reflect the changes in the status of the aircraft. For example, referring again to FIG. 3, the annotation information 336 may be automatically removed from the navigational map 300 when the flight phase of the aircraft 130 does not correspond to the missed approach or holding flight phase (e.g., when the aircraft 130 exits the missed approach or holding flight phase), the annotation information 342 may be automatically removed from the vertical profile 308 once the aircraft 130 is no longer within a threshold distance of the final approach fix 340, or the annotation information 352 may be automatically removed from the aircraft configuration display 334 when the aircraft 130 exits the single-engine operating mode.

Figure 5:
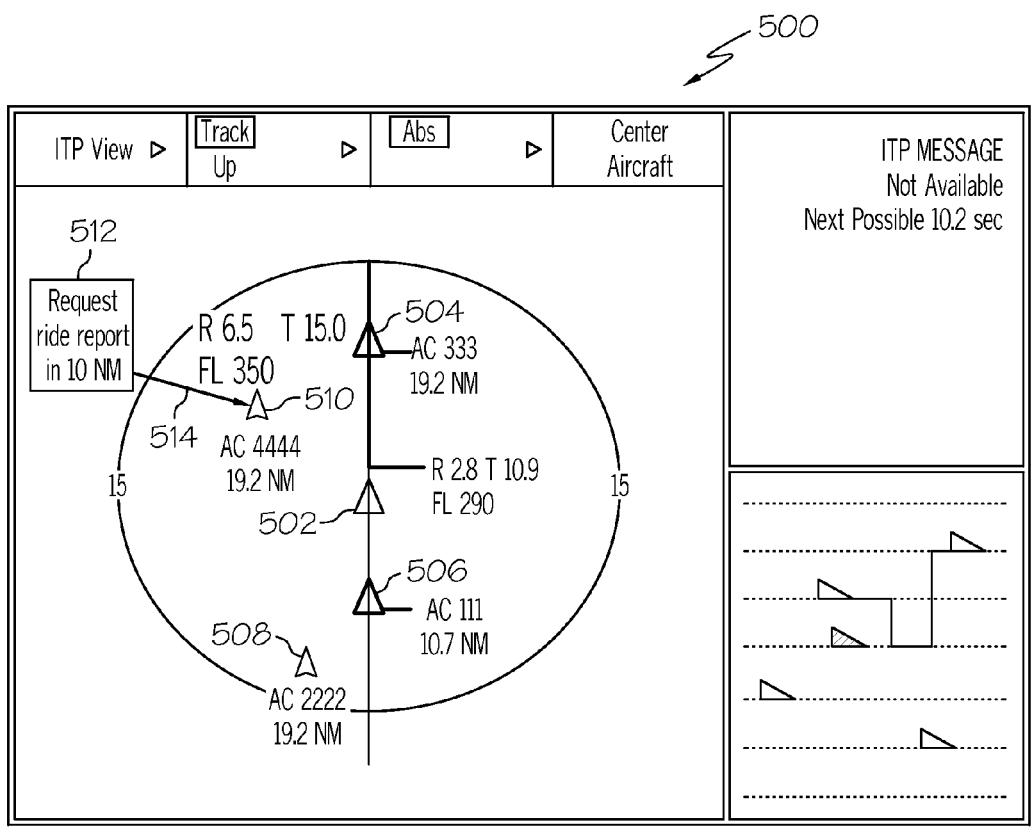
FIG. 5 is a schematic view of an exemplary aircraft display suitable for use with the annotation process of FIG. 2 and the display process of FIG. 4 in accordance with one embodiment.

FIG. 5 depicts an exemplary embodiment of an aircraft display 500 suitable for use with the annotation process 200 and display process 400 described above. For example, referring now to FIG. 5, and with continued reference to FIGS. 1-2 and FIG. 4, the processing system 108 and/or display system 110 may display and/or render an aircraft display 500 associated with a current (or instantaneous) location of the aircraft 130 on the display device 102. In this regard, the aircraft display 500 includes a graphical representation 502 of the aircraft 130 as well as graphical representations of any other aircraft 504, 506, 508, 510 within a certain distance of the aircraft 130, 502. The user may indicate a desire to add an annotation to the aircraft display 500 by manipulating the user input device 104 to position a cursor or pointer over an aircraft 510 of the plurality of aircraft 504, 506, 508, 510 that the user would like to annotate. After selecting or otherwise identifying the aircraft 510, the user may then provide annotation information, such as, for example, a reminder to request a ride report from the identified aircraft 510 in ten nautical miles. The annotation information and the association with the aircraft 510 is stored and/or maintained by the processing system 108 and/or data storage element 120, as described above, and a graphical representation of the annotation information 512 is displayed with an arrow 514 indicating the association between the annotation information 512 and the aircraft 510. As described above, the annotation information 512 is positioned relative the aircraft 510, and the annotation information 512 may be updated or otherwise dynamically repositioned such that the location of the annotation information 512 on the aircraft display 500 varies as the aircraft 510 travels relative to aircraft 130, 502.

As described above, in some embodiments, the user may also provide display criteria to control subsequent display of the annotation information 512. For example, the user may identify or otherwise specify that the annotation information 512 should only be displayed if the altitude of the aircraft 130, 502 has not changed, or is within a certain range of altitudes relative to aircraft 510. For example, the user may operate the aircraft 130, 502 to change the flight level of the aircraft 130, 502, in which case the ride report from aircraft 510 would not be relevant. Thus, the user may provide altitude criterion for the annotation information 512, such that the annotation information 512 is removed from the aircraft display 500 when the ride report from aircraft 510 would no longer be relevant to the altitude of aircraft 130, 502. Similarly, the user may provide distance criteria for the annotation information 512, such that the annotation information 512 is not displayed when a distance between the aircraft 510 and the aircraft 130, 502 exceeds a particular amount where the ride report from aircraft 510 would no longer be relevant to the operation of aircraft 130, 502.

FIG. 6 depicts an exemplary embodiment of a radio frequency tuning display 600 suitable for use with the annotation process 200 and display process 400 described above. For example, referring now to FIG. 6, and with continued reference to FIGS. 1-2 and FIG. 4, the processing system 108 and/or display system 110 may display and/or render a radio frequency tuning display 600 on the display device 102. In this regard, the radio frequency tuning display 600 includes a list of a plurality of possible radio frequencies for operating the aircraft 130 in the vicinity of a particular airport, navigational reference point or waypoint, air traffic control center, or the like. The user may indicate a desire to add an annotation to the radio frequency tuning display 600 by manipulating the user input device 104 to position a cursor or pointer over a radio frequency 602 from the list that the user would like to annotate. After selecting or otherwise identifying the radio frequency 602, the user may then provide annotation information, such as, for example, a reminder to only use that frequency on the east side of the airport that the radio frequency tuning display 600 pertains to. The annotation information and the association with the radio frequency 602 is stored and/or maintained by the processing system 108 and/or data storage element 120, as described above, and a graphical representation of the annotation information 604 is displayed with an arrow 606 indicating the association between the annotation information 604 and the radio frequency 602. As described above, in some embodiments, the user may also provide display criteria to control subsequent display of the annotation information 604. For example, the user may identify or otherwise specify that the annotation information 604 should only be displayed when the aircraft 130 is not east of the airport the radio frequency tuning display 600 pertains to. In this regard, when the processing system 108 determines or otherwise identifies that the aircraft 130 is east of the airport, the annotation information 604 may be removed from the radio frequency tuning display 600. Conversely, when the processing system 108 determines or otherwise identifies that the aircraft 130 is west of the airport, the annotation information 604 is presented on the radio frequency tuning display 600 to remind the user not to select radio frequency 602.

To briefly summarize, the methods and systems described above allow a user, such as a pilot or crew member, to annotate content presented on a display device onboard an aircraft. For example, the user may annotate aircraft procedure information displayed on the display device to remind the user of a particular piece of information gained from previous experience executing the particular aircraft procedure. The annotations may be stored and associated with display criteria to control subsequent display of the annotations and limit the display of the annotations to relevant operating conditions for the aircraft. In this manner, only the currently relevant annotations are displayed, allowing a user to quickly and reliably glean the information during operation of the aircraft in a manner that allows the user to maintain situational awareness while simultaneously reviewing the content displayed on the display device.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for presenting content on a display device onboard an aircraft, the method comprising:
   displaying, on the display device, information corresponding to a first procedure, the first procedure being associated with an airport and prescribing operation of the aircraft in a vicinity of the airport;
   obtaining a current altitude of the aircraft; and
   automatically displaying an annotation associated with the first procedure on the display device when the current altitude of the aircraft satisfies an altitude criterion associated with the annotation, wherein the annotation comprises user-defined information pertaining to the first procedure.

2. The method of claim 1, the annotation being associated with a flight phase criterion, wherein displaying the annotation further comprises:
   identifying a current flight phase of the aircraft; and
   displaying the annotation when the current flight phase of the aircraft satisfies the flight phase criterion.

3. The method of claim 2, the flight phase criterion comprising a first flight phase, wherein displaying the annotation comprises:
   automatically displaying the annotation when the current flight phase corresponds to the first flight phase; and
   automatically removing the annotation from the display device when the current flight phase and the first flight phase are different.

4. The method of claim 1, wherein:
   displaying information corresponding to the first procedure comprises displaying a vertical profile for an approach procedure for the airport; and
   displaying the annotation comprises displaying the annotation on the vertical profile.

5. The method of claim 1, further comprising displaying a map on the display device, the map corresponding to a geographical area including the airport, wherein the information corresponding to the first procedure and the annotation are displayed on the map.

6. The method of claim 5, wherein:
   the information corresponding to the first procedure includes an object;
   the annotation is associated with the object; and
   displaying the annotation comprises displaying the annotation on the map relative to the object.

7. The method of claim 6, wherein displaying the annotation comprises automatically repositioning the annotation on the map relative to the object.

8. The method of claim 6, further comprising determining that a distance between the aircraft and a location corresponding to the object is less than a threshold distance, wherein displaying the annotation comprises automatically displaying the annotation in response to determining that the distance between the aircraft and the location corresponding to the object is less than the threshold distance.

9. The method of claim 1, wherein the step of obtaining status information for the aircraft comprises obtaining a current flight phase of the aircraft, wherein the annotation is automatically displayed when the current flight phase satisfies a flight phase criterion associated with the annotation.

10. A method for presenting content on a display device onboard an aircraft, the method comprising:
    displaying, on the display device, a vertical profile for an approach procedure associated with an airport, the approach procedure prescribing operation of the aircraft in a vicinity of the airport; and
    displaying an annotation associated with the approach procedure on the vertical profile, wherein the annotation comprises user-defined information pertaining to the approach procedure.

11. A method for presenting information on a display device associated with an aircraft, the method comprising:
    displaying content pertaining to operation of the aircraft on the display device, the content including one or more displayed objects;
    identifying an annotation associated with a first displayed object of the one or more displayed objects, the annotation comprising annotation information received from a user;
    obtaining status information for the aircraft;
    determining whether one or more display criteria associated with the annotation are satisfied based on the status information for the aircraft;
    automatically displaying the annotation information on the display device in response to determining the one or more display criteria are satisfied by the status information; and
    automatically removing the annotation information when the status information for the aircraft does not satisfy the one or more display criteria.

12. A method for presenting information on a display device associated with an aircraft, the method comprising:
    displaying content pertaining to operation of the aircraft on the display device, the content including one or more displayed objects;
    receiving annotation information from a user, the annotation information corresponding to an annotation associated with a first displayed object of the one or more displayed objects;
    receiving a display criterion corresponding to the annotation;
    associating the annotation information, the display criterion, and the first displayed object;
    identifying the annotation associated with the first displayed object;
    obtaining status information for the aircraft;
    determining whether the display criterion associated with the annotation is satisfied based on the status information for the aircraft;

automatically displaying the annotation information on the display device when the status information for the aircraft satisfies the display criterion; and automatically removing the annotation information when the status information for the aircraft does not satisfy the display criterion.

13. The method of claim 12, further comprising obtaining a plurality of annotations from a server communicatively coupled to the aircraft, wherein identifying the annotation comprises identifying a first annotation of the plurality of annotations, the first annotation being associated with the first displayed object.

14. The method of claim 12, further comprising uploading the annotation information for the annotation to a server communicatively coupled to the aircraft, the server being configured to maintain an association between the annotation information, the display criterion, and the first displayed object.

15. A system comprising:
a display device onboard an aircraft;
a data storage element configured to maintain annotation information for an annotation, the annotation information comprising user-defined information pertaining to an approach procedure prescribing operation of the aircraft in a vicinity of an airport; and
a processing system coupled to the display device and the data storage element, wherein the processing system is configured to:
display a vertical profile for the approach procedure associated with the airport on the display device; and
display the annotation information for the annotation associated with the approach procedure on the vertical profile.

16. A system comprising:
a display device onboard an aircraft, the display device having content pertaining to operation of the aircraft displayed thereon, wherein the content comprises one or more displayed objects;
a data storage element configured to maintain annotation information for one or more annotations, the annotation information for each respective annotation being associated with one or more display criteria; and
a processing system coupled to the display device and the data storage element, wherein the processing system is configured to:
identify a first annotation of the one or more annotations, the first annotation being associated with a first displayed object of the one or more displayed objects;
obtain status information for the aircraft;
automatically display annotation information corresponding to the first annotation on the display device when the status information satisfies a display criterion for the first annotation; and
automatically remove the annotation information corresponding to the first annotation when the status information does not satisfy the display criterion.

17. The system of claim 16, further comprising a flight management system onboard the aircraft, the flight management system being configured to identify a flight phase for the aircraft, wherein the processing system is coupled to the flight management system and configured to automatically display the annotation information when the flight phase for the aircraft satisfies a flight phase criterion for the first annotation.

18. The system of claim 16, further comprising a user input device coupled to the processing system, wherein the processing system is configured to:
receive the annotation information corresponding to the first annotation from a user via the user input device; and
receive the display criterion for the first annotation from the user via the user input device, wherein the data storage element maintains an association between the annotation information, the display criterion, and the first displayed object.

19. The system of claim 16, wherein:
a navigational map associated with a current location of the aircraft is displayed on the display device; and
aircraft procedure information is displayed on the display device overlying the navigational map, the aircraft procedure information including the first displayed object.

* * * * *